(No Model.)

A. KRAISS.
CLAMP.

No. 252,779. Patented Jan. 24, 1882.

Witnesses:
George F. Robinson
James W. Holcomb

Inventor
Andrew Kraiss
by Bradford Howland
Attorney

UNITED STATES PATENT OFFICE.

ANDREW KRAISS, OF NEW MILFORD, OHIO.

CLAMP.

SPECIFICATION forming part of Letters Patent No. 252,779, dated January 24, 1882.

Application filed December 14, 1881. (No model.)

*To all whom it may concern:*

Be it known that I, ANDREW KRAISS, of New Milford, Portage county, Ohio, have invented a new and useful Improvement in Clamps, of which the following is a specification.

My invention relates to that class of clamps which are used in making molding-patterns to press and hold together the parts which have been glued.

The object of my invention is a clamp formed of two ordinary clamps, each having a swivel attached to its top, in combination with a screw-threaded rod connecting the swivels, and is mainly for the purpose of holding and pressing together two pieces of wood or other material, forming miter and other joints, such as the parts forming the joints of buggy-seats.

Figure 1:
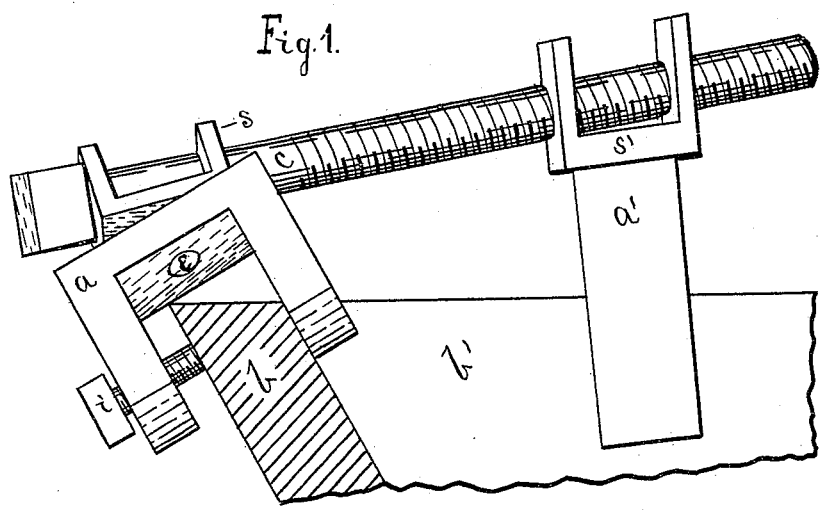
Figure 2:
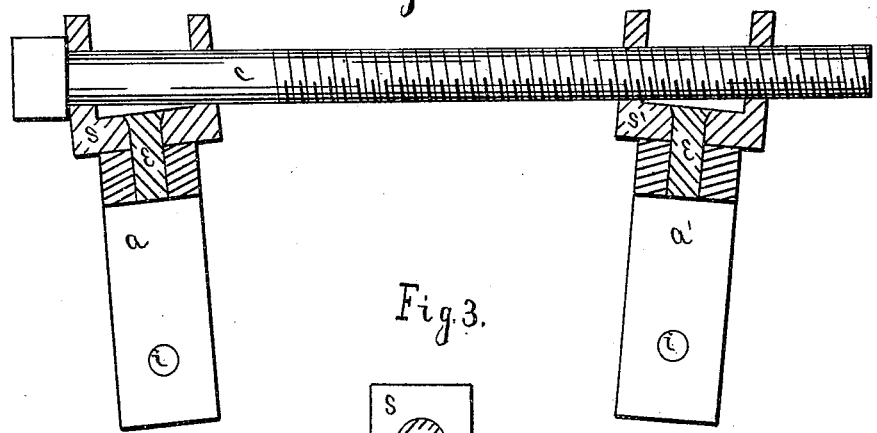
Figure 3:
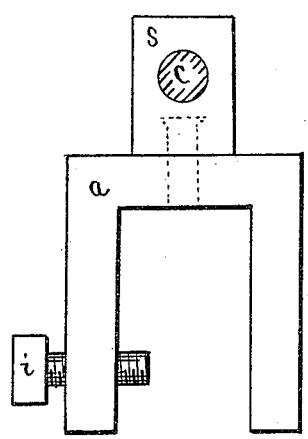

In the drawings, Figure 1 is a perspective view, showing the application of the clamp to jointing pieces, one of which is inclined and the other perpendicular. Fig. 2 is a longitudinal section. Fig. 3 is a cross-section.

The clamp $a$ has a screw, $i$, by which to fasten it, and is similar to an ordinary clamp, except that it is provided with a swivel, $s$, which turns on pin $e$, fastened in the top of the clamp. Clamp $a'$ and swivel $s'$ are similar to clamp $a$ and swivel $s$. Swivel $s$ is connected by rod $c$, having a screw-thread, with swivel $s'$, which is also screw-threaded to receive the rod.

Rod $c$ is slightly diagonal to swivels $s\ s'$ and clamps $a\ a'$, which are downwardly inclined toward each other, as shown in Fig. 2, for the purpose of adapting them to peculiar relative positions, as in Fig. 1.

In operating the device, clamps $a\ a'$ are first to be placed on parts $b\ b'$, the swivels $s\ s'$ allowing the clamps to assume such relative positions as may be required. Clamps $a\ a'$ may then be firmly fastened to parts $b\ b'$ by turning screws $i$. When so fastened the parts $b\ b'$ may be drawn and pressed together by turning screw-rod $c$.

I claim as my invention—

1. The clamps $a\ a'$, provided with swivels $s\ s'$, in combination with a screw-threaded rod, $c$, substantially as described.

2. The screw-threaded rod $c$, in combination with and diagonal to swivels $s\ s'$ and clamps $a\ a'$, substantially as described.

ANDREW KRAISS.

Witnesses:
BRADFORD HOWLAND,
JAMES W. HOLCOMB.